United States Patent
Doll et al.

(10) Patent No.: US 7,806,598 B2
(45) Date of Patent: Oct. 5, 2010

(54) METHOD OF PROTECTING ROLLER ELEMENT BEARING ASSEMBLIES AGAINST OIL-OUT CONDITIONS AND BEARING ASSEMBLIES MADE THEREBY

(75) Inventors: Gary L. Doll, Canton, OH (US); Ryan D. Evans, Canton, OH (US); Stephen P. Johnson, White River Junction, VT (US)

(73) Assignee: The Timken Company, Canton, OH (US)

( * ) Notice: Subject to any disclaimer, the term of this patent is extended or adjusted under 35 U.S.C. 154(b) by 537 days.

(21) Appl. No.: 11/908,387

(22) PCT Filed: Mar. 16, 2006

(86) PCT No.: PCT/US2006/009538
§ 371 (c)(1),
(2), (4) Date: Sep. 11, 2007

(87) PCT Pub. No.: WO2006/101989
PCT Pub. Date: Sep. 28, 2006

(65) Prior Publication Data
US 2008/0304783 A1 Dec. 11, 2008

Related U.S. Application Data

(60) Provisional application No. 60/663,229, filed on Mar. 18, 2005.

(51) Int. Cl.
*F16C 33/62* (2006.01)
(52) U.S. Cl. .................... 384/569; 384/492; 384/913
(58) Field of Classification Search ............ 384/571, 384/492, 569, 912, 913
See application file for complete search history.

(56) References Cited

U.S. PATENT DOCUMENTS

| 3,675,978 | A | * | 7/1972 | McKelvey ............. 384/463 |
| 4,522,453 | A | * | 6/1985 | Lammer et al. ........... 384/42 |
| 5,067,826 | A | * | 11/1991 | Lemelson ............. 384/492 |
| 5,593,234 | A | * | 1/1997 | Liston ............... 384/492 |
| 5,700,094 | A | * | 12/1997 | Dam et al. ............. 384/569 |
| 6,340,245 | B1 | * | 1/2002 | Horton et al. ........... 384/492 |

(Continued)

OTHER PUBLICATIONS

Ludema, Kenneth C., "Friction, Wear, Lubrication, A Textbook in Tribology" 1996, CRC Press Inc., p. 178.*

(Continued)

*Primary Examiner*—Thomas R Hannon
(74) *Attorney, Agent, or Firm*—Polster, Lieder, Woodruff & Lucchesi, L.C.

(57) ABSTRACT

A method of enhancing the operating life of roller bearings assemblies (B) subject to oil-out conditions is disclosed. The method comprises applying a tribological metal carbide reinforced amorphous hydrocarbon coating layer (16) over either the sliding surfaces (SS) or the rolling surfaces (RS) of the bearing assembly rolling elements (RE), but is preferably applied at least to the sliding surfaces of the rolling element. The coating has a thickness determined according to the equation: Formula (I), where d=coating thickness P=is the ratio of force applied to the rollers/contact area; n=the number of rollers; $(t-t_0)$=the desired operating time after oil-out condition starts; and K' is the Archard constant.

$$\frac{d}{K'} = \frac{Pv}{n}(t-t_0), \quad (1)$$

17 Claims, 2 Drawing Sheets

U.S. PATENT DOCUMENTS

2003/0185478 A1    10/2003    Doll
2004/0179762 A1*   9/2004     Doll et al. ................... 384/492

OTHER PUBLICATIONS

R. Evans, et. al., Nanocomposite Tribological Coatings for Rolling Element Bearings, Mat. Res. Soc. Symp. Proc. vol. 750, pp. Y4.8.1-Y4.8.11 (2003).

G. Doll, et al., Engineered Surfaces for Steel Rolling Element Bearings and Gears, MS&T 2004 Conference Proceedings, pp. 367-374 (2004).

International Preliminary Report from corresponding PCT Application No. PCT/US2006/009538.

International Search Report, corresponding to PCT Application No. PCT/US2006/009538.

Written Opinion of the International Searching Authority, corresponding to PCT Application No. PCT/US2006/009538.

International Preliminary Report on Patentability from corresponding International Application No. PCT/US2006/009538, mailed Dec. 13, 2007.

* cited by examiner

METHOD OF PROTECTING ROLLER ELEMENT BEARING ASSEMBLIES AGAINST OIL-OUT CONDITIONS AND BEARING ASSEMBLIES MADE THEREBY

CROSS-REFERENCE TO RELATED APPLICATIONS

This application is the US National Stage under 35 U.S.C. §371 of International App. No. PCT/US2006/009538 filed Mar. 16, 2006, which claims priority to U.S. Provisional Patent App. No. 60/663,229 filed Mar. 18, 2005, and which is incorporated herein by reference.

STATEMENT REGARDING FEDERALLY SPONSORED RESEARCH OR DEVELOPMENT

Not Applicable.

BACKGROUND OF THE INVENTION

This invention relates to roller bearing assemblies, and in particular to a method of protecting a bearing assembly against oil-out conditions and a bearing assembly made in accordance with the method.

Adhesive wear in mechanical components results when parts which move relative to each other come into contact under loads and speeds sufficient to generate micro welding of asperities on the contacting surfaces. When a mechanical system suffers from a catastrophic loss of lubrication, adhesive wear between such parts leads to galling of the parts and the seizure of the system. The catastrophic loss of lubrication in aerospace systems such as rotorcraft gearboxes and turbine engine bearings is referred to as an oil-out condition. An oil-out condition in gearboxes and turbine engines usually precipitates a bearing failure, which renders the system inoperative.

Depending upon operating conditions such as load and speed, the amount of time from oil-out to bearing failure can be a few seconds to many minutes. Roller bearing assemblies in new turbine engine designs must endure intermittent oil-out conditions under full loads and speeds for at least thirty seconds. It is desirable for roller bearing assemblies in rotorcraft gearboxes to continue to operate for more than thirty minutes following an irreversible loss of lubrication.

SUMMARY OF THE INVENTION

Briefly stated, a method of enhancing the operating life of roller bearing assemblies subject to oil-out conditions is disclosed. As is known, roller bearing assemblies comprise inner and outer races and roller elements positioned between the inner and outer races. The roller elements are rollers or roller elements and have sliding surfaces and rolling surfaces. The method comprises applying a tribological metal carbide reinforced amorphous hydrocarbon coating layer over critical surfaces of roller bearing assembly. The tribological coating layer can be applied to either the sliding surfaces or the rolling surfaces of the roller element, but is preferably applied at least to the sliding surfaces of the roller element. In a tapered roller bearing assembly, wherein the roller element has a large end face and a small end face, the tribological coating layer is applied at least over the large end face of the roller element to provide wear protection at the roller end/rib interface.

In accordance with one aspect of the invention, the wear byproduct of the coating is graphite.

A tribological coating containing tungsten carbide (WC) has been found to work well to increase the life of the bearing assembly when operating under oil-out conditions. The WC is in a crystalline form dispersed in an amorphous carbon or hydrocarbon matrix. The WC crystals are less than about 10 nm in size, and WC can comprise less than 50% of the tribological coating layer.

In accordance with another aspect of the invention, an adhesion layer is coated over the bearing surface and the tribological coating layer is applied over the adhesion layer.

The depth d of the tribological coating layer affects how long the bearing assembly can operate in an out-of-oil condition. The depth or thickness of the tribological coating layer is determined according to the Archard equation:

$$\frac{d}{K'} = \frac{Pv}{n}(t - t_0),$$

where d=coating depth
P=is the ratio of force applied to the rollers/contact area;
n=the number of roller elements;
(t−$t_0$)=the desired operating time after oil-out condition starts; and
K' is the Archard constant.

Preferably, d and K' are both small numbers. In a preferred embodiment of the coating, K' is less than $1\times10^{-16}$ Pa-m and d is less than 5 μm.

DETAILED DESCRIPTION OF THE INVENTION

Figure 1:
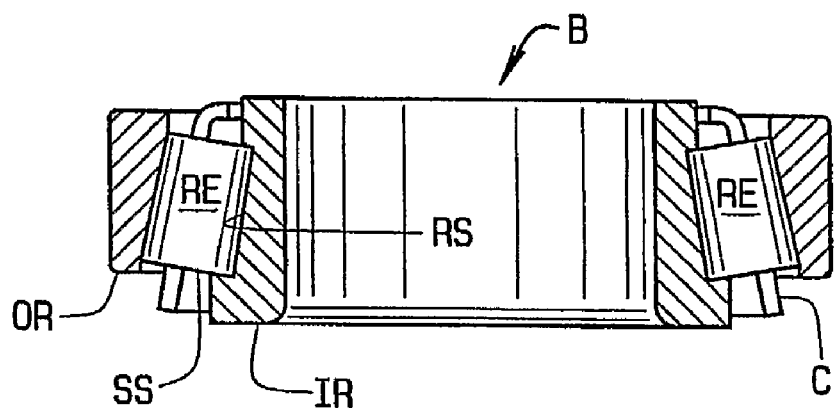
FIG. 1 is a cross-sectional view of a bearing assembly.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

As is known, bearing assemblies B include an outer race OR, an inner race IR and a plurality of roller elements RE positioned between the two races. The roller elements, which are shown in FIG. 1 to be tapered roller elements, are typically held in place relative to each other by means of a cage C. In a bearing assembly, the roller elements have sliding surfaces SS and rolling surfaces SR. In tapered roller bearing assemblies, such as shown in FIG. 1, the roller element side surface is the rolling surface and the roller element end surfaces, and in particular the roller element large end surface, are the sliding surfaces.

Figure 2:
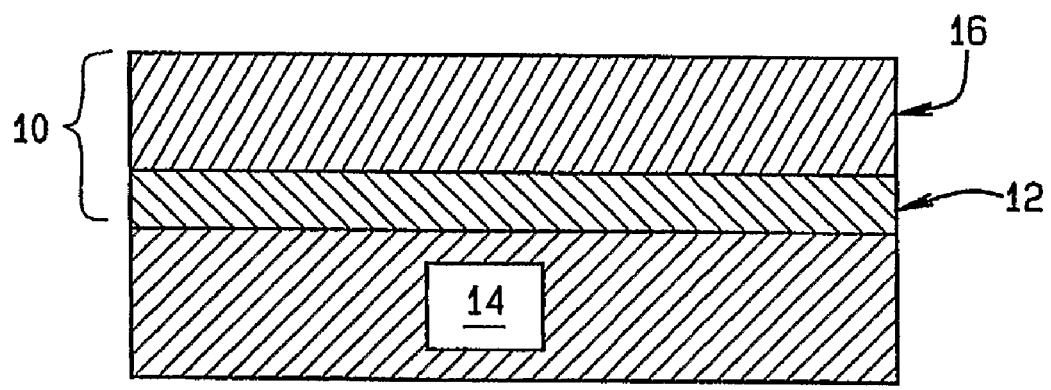
FIG. 2 is a schematic cross-sectional drawing of the coating of the present invention applied to a roller element surface.

This invention describes the use of tribological coatings applied to critical surfaces, and in particular, to the sliding surfaces, of roller elements to temporarily defeat the adhesive wear associated with oil-out conditions, thereby increasing the time to failure of the most critical components of a system. As shown in FIG. 2, a coating 10 made in accordance with the present invention comprises a metallic adhesion layer 12 that is applied to the sliding surface 14 of a roller element. This sliding surface 14 comprises the opposed end surfaces of the roller elements, including tapered rollers, cylindrical rollers, spherical rollers, and needle rollers. In a ball bearing, the surface of the ball bearing is both a sliding surface and a rolling surface. A tribological coating layer 16 is applied over the metallic adhesion layer 12. The tribological coating layer comprises metal carbides contained in an amorphous carbon or hydrocarbon matrix (MC/aC or MC/aC:H).

Metal carbide reinforced amorphous carbons or hydrocarbon coatings are nanocomposite materials, comprised of metal carbide particles (with dimensions typically less than 10 nm) contained in amorphous matrices. The particles are dispersed in the matrices which enhances the toughness and hence the fracture resistance of the coating. Another important aspect of these coatings is that they do not adhesively interact with steel, which makes them effective barriers to the adhesive wear that arises during oil-out conditions. The adhesion layer 12 strongly adheres to the steel substrates, and the tribological coating layer adheres strongly to the adhesion layer. The adhesion layer can comprise metals such as Cr and Ti.

The coating 10 can be applied by means of sputtering or chemical vapor deposition. Although the drawing of FIG. 2 shows a sharp transition between the adhesion or metal transition layer 14 and the tribological coating layer 16, in reality, there is a more gradual transition forming a metal carbide gradient between the two layers. Towards the metal layer side of the transition portion, the metal carbide content is low, and the metal carbide content increases towards the tribological coating layer 16.

When the metal carbide is a tungsten carbide, the WC coating comprises WC crystals in an amorphous matrix. The matrix can be an amorphous carbon matrix (aC) or an amorphous hydrocarbon matrix (aC:H). The WC crystals make up less than 50% of the coating, and preferably less than 20% of the coating. The WC crystals are small, having a crystal size of less than 10 nm.

Suppose that during an oil-out event, the time to failure of a given roller element is defined as $t_0$. The wear coefficient of a tribological coating can be expressed in terms of the Archard equation as:

$$K = \frac{HVn}{Fl} \qquad (1)$$

Where H is the hardness of the coating (in N/m²), F/n is the applied load/roller element (in N), l is the sliding distance (in m), and V is the volume of material worn away (in m³). Many times the Archard equation is expressed in terms of K'=K/H. If the sliding distance l can be equated to the product of the sliding speed and the time (t) during which the bearing assembly operates under an oil-out condition, and if V can be expressed in terms of the contact area (A) and the worn depth of the coating (d), then Eq. 1 becomes $$K' = \frac{nAd}{Fvt} \qquad (2)$$

Solving for t', $$t' = \frac{nd}{PvK'}, \qquad (3)$$

where the substitution P=F/A has been used.

If the coating 10 is applied to the critical elements (i.e., sliding surfaces) of a bearing assembly that are otherwise responsible for bearing failure during an oil-out event, the life of that bearing assembly will be extended while the coating is wearing away. Once the coating is worn away, the bearing assembly will fail. If d is the total thickness of the coating, then t' describes the additional life provided by a tribological coating to a component in an oil-out condition. Hence the life of the bearing assembly in an oil-out event will be equal to $$t = t_0 + t' = t_0 + \frac{nd}{PvK'} \qquad (4)$$

K' is a value that can be determined experimentally on laboratory tribometers, and P, n and v are determined by the application and/or component design. Inspection of Eq. 4 implies that thick coatings with small K' values applied to the critical (i.e., sliding) surfaces of roller elements will lead to the largest values of t'. In practice, several aspects of the application such as the contact stress, geometrical tolerances, and thermal resistance limit the thickness of tribological coatings for example. Additionally, hard coatings (small K') typically have large elastic moduli, which mean that they can have very large internal stresses. It is the nature of hard coatings that the contact stress increases with coating thickness. Hence, there exists a compromise between K' and d for most tribological coatings. Finally, it is important that the coating wears in a molecular or atomic fashion as opposed to fracture and delamination.

The family of metal carbide reinforced amorphous carbons and hydrocarbons can be synthesized to have high values of d (~5 μm), low values of K' (~$10^{-17}$ m²/N), and exhibit molecular or atomic wear without fracture and delamination. Additionally, the wear byproduct of these types of coatings is graphite, a very good solid lubricant.

In summary, the important attributes of tribological coatings utilized to extend the life of roller bearing assemblies in oil-out conditions are (1) strong adhesion to the steel substrate; (2) barrier to adhesive interactions with steel; (3) wear atomically or molecularly and not through fracture and delamination; and (4) a large ratio of d/K'. Intuitively the friction coefficient was assumed to be the most desirable attribute of a tribological coating in order to extend bearing life under oil-out conditions. Surprisingly, this turns out not to be the case.

Figure 3:
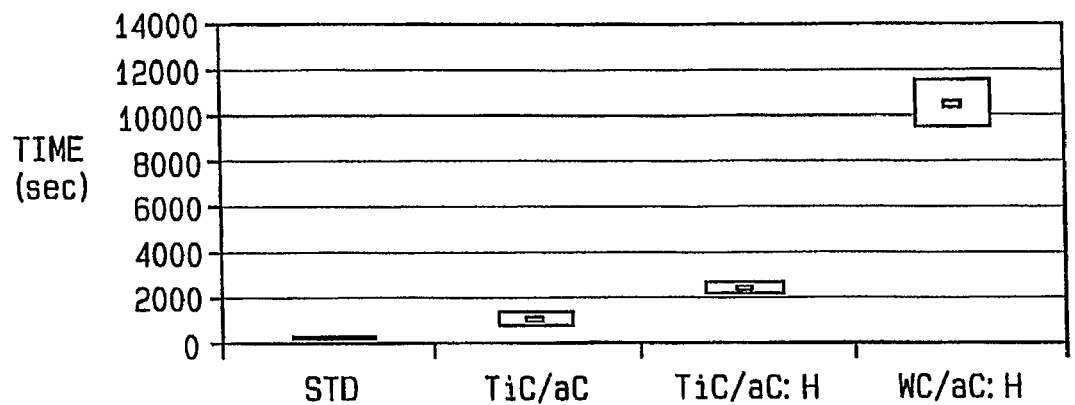
FIG. 3 is a graph charting test data of the effectiveness of different coatings to extend the life of a bearing assembly operating under an oil-out condition.

Table 1 lists three types of metal carbide reinforced amorphous carbon and hydrocarbon coatings along with their friction coefficients (μ), nominal thicknesses (d), and d/K' values. These coatings were applied by reactive and non-reactive sputtering, a physical vapor deposition process, to the large ends of roller elements available from The Timken Company under its M86600 series. Eighteen (n=18) coated roller elements were then assembled into bearing assemblies, and the bearing assemblies were tested under oil-out conditions with a specified load of 4448 N (157 MPa) contact stress and sliding speed of 2700 rpm (1.2 m/s) between large roller end and rib face. The results of the testing are shown in FIG. 3. Standard bearing assemblies lasted about 6 minutes under these conditions, while bearing assemblies with TiC/aC, TiC/aC:H, and WC/aC:H coatings lasted approximately 4, 9, and 56 times longer. Thus, while the TiC coatings worked acceptably to allow operation of the bearing assembly under an oil-out condition, the bearing assembly having the WC coating lasted significantly longer than the bearing assembly having the Ti coating.

TABLE 1

Properties of some MC/aC:H Coatings

| Coating | μ | d (μm) | K' (Pa-m) |
|---|---|---|---|
| TiC/aC | 0.07 | 1 | $1 \times 10^{-16}$ |
| TiC/aC:H | 0.15 | 2 | $9 \times 10^{-17}$ |
| WC/aC:H | 0.20 | 3 | $2 \times 10^{-17}$ |

Figure 4:
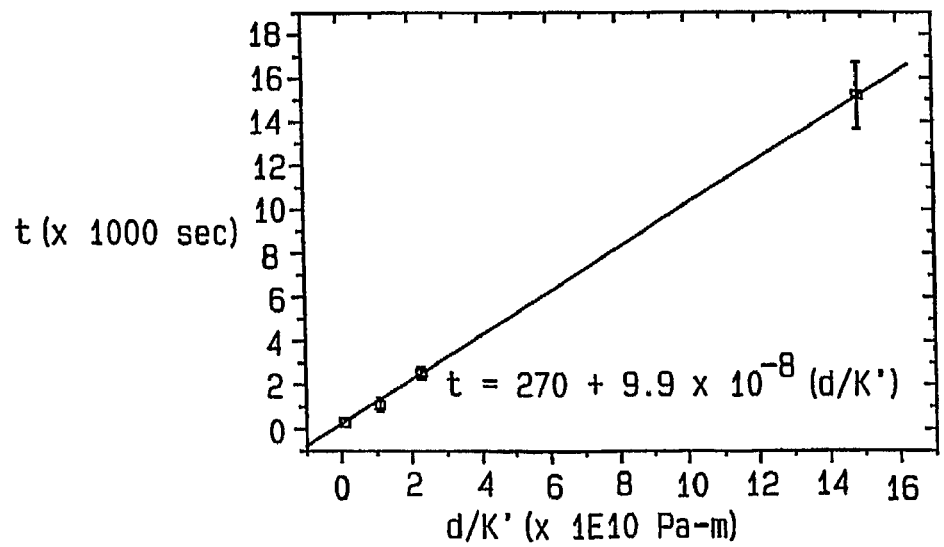
FIG. 4 is a plot of a mathematical analysis of the results shown in FIG. 3 in terms of the Archard analysis of Equation 4 below.

The data graphed in FIG. 4 can be analyzed in terms of Eq. 4 with t plotted as a function of d/K'. A linear fit to the data yields $$t = 270 + 9.9 \times 10^{-8}\left(\frac{d}{K'}\right). \quad (5)$$

Comparison of Equations 5 and 4 indicates that $t_0=270$ seconds, and $(n/Pv)=9.9\times10^{-8}$ (s/Pa-m). It is calculated that a thrust load of 4448 N generates about 157 MPa of contact stress, and 2700 rpm corresponds to 1.2 m/s of roller end/rib face speed in Timken M86600 series bearings. The values of the fitted slope ($9.9\times10^{-8}$ s/Pa-m) and the calculated value ($9.2\times10^{-8}$ s/Pa-m) of (n/Pv) are in good agreement. Eq. 4 may need a scaling factor to account for additional wear modes or other effects not included in the Archard analysis. However, the model of Eq. 4 appears to be very effective in terms of calculating the additional life that a coating on a roller end provides to a tapered roller element in an oil-out condition.

The applicability of Eq. 4 need not be limited to the large roller ends of tapered roller elements. The coating can be applied to the small end of tapered roller elements, one or both ends of cylindrical roller elements, and the bodies (or sides) of rollers for cylindrical and spherical roller elements. Since it is difficult to apply the metal carbide reinforced amorphous carbon and hydrocarbon coatings to spherical ball surfaces, and since these coatings sometimes appear to promote early ball bearing failure when they are applied to the raceways of ball bearing rings, other types of coatings may be better suited for ball bearing applications.

It will be appreciated that roller elements treated in accordance with the method outlined above can advantageously be used in rotorcraft gearbox bearings and turbine engine bearings.

As various changes could be made in the above constructions without departing from the scope of the invention, it is intended that all matter contained in the above description or shown in the accompanying drawings shall be interpreted as illustrative and not in a limiting sense.

The invention claimed is:

1. A method for enabling bearing assemblies to sustain operation under oil-out conditions, the bearing assemblies comprising inner and outer races and roller elements positioned between the inner and outer races, the roller elements having opposed end surfaces and a side surface; one or both of said end surfaces defining a sliding surface and said side surface defining a rolling surface; the method comprising:

determining a thickness of a tribological metal carbide coating sufficient to enable the bearing assembly to operate for at least a predetermined period of time in the absence of oil, the thickness of the coating being determined according to the equation:

$$d = \frac{K'Pv}{n}(t - t_0)$$

where d=coating thickness
   P is the ratio of force applied to the roller elements/contact area;
   v is the sliding velocity;
   n=the number of roller elements;
   $(t-t_0)$=the desired operating time after oil-out condition starts; and
   K' is the Archard constant;
   and the ratio d/K' greater than $10^{11}$ Pa-m; and
   applying the tribological coating to one or both end surfaces of the roller elements.

2. The method of claim 1 wherein the metal carbide is a tungsten carbide.

3. The method of claim 2 wherein the metal carbide phase comprises less than 50% of the tribological coating layer.

4. The method of claim 2 wherein the metal carbide phase is in a crystalline form dispersed in an amorphous matrix, the metal carbide crystals having a size of less than about 10 nm.

5. The method of claim 1 wherein the step of applying the coating comprises applying the coating to both end surfaces of the roller elements.

6. The method of claim 1 wherein the roller element is a tapered roller, the roller element having a large end, the bearing assembly further comprising a thrust rib on the inner race; the step of applying the coating to the roller element comprising applying the coating to the large end of roller element which is adjacent the thrust rib in the assembled bearing assembly to provide wear protection at the roller end/rib interface.

7. The method of claim 1 wherein said step of applying the coating comprises applying the coating to the rolling surface of the roller elements to provide wear protection between the rollers and raceways of the bearing assembly.

8. The method of claim 1 wherein d and K' are both small numbers.

9. The method of claim 8 wherein K' is less than $1\times10^{-16}$ Pa$^{-1}$ and d is less than 5 μm.

10. The method of claim 1 wherein the wear byproduct of the coating is graphite.

11. The method of claim 1 wherein the step of applying the tribological coating is conducted via a vapor deposition process.

12. A method of enhancing the operating life of bearing assemblies subject to oil-out conditions, the bearing assemblies comprising inner and outer races and roller elements positioned between the inner and outer races, the roller elements having a side surface, a first end face and a second end face; the method comprising:

determining the thickness of a metal carbide/amorphous hydrocarbon coating which will enable the bearing to operate for a predetermined period of time after an oil-out condition starts; and applying a metal carbide/amorphous hydrocarbon coating layer over at least one of the first end face and the second end face of the roller element; said coating being applied to have a thickness of said determined thickness; wherein the tungsten carbide coating layer comprises crystalline tungsten carbide contained in an amorphous carbon or amorphous hydrocarbon matrix; the wear byproduct of the coating being graphite; and the ratio d/K' is greater than $10^{11}$ Pa-m; where:

d=coating thickness, and

K' is the Archard constant.

13. The method of claim 12 wherein the metal carbide crystals have a size of less than about 10 nm.

14. The method of claim 12 wherein the coating metal carbide/amorphous hydrocarbon layer comprises an outer layer, the coating further comprising an adhesion layer between the roller element surface and the outer layer; the metal carbide phase comprising less than 50% of the coating outer layer.

15. A roller bearing assembly comprising an inner race, an outer race, and a plurality of roller elements positioned between the inner and outer races; the roller elements comprising a side surface, a first end face and a second end face; the roller elements having a coating applied only to one or both of the first end face and the second end face of the roller element; the coating comprising an outer layer comprised of crystalline tungsten carbide contained in an amorphous carbon or amorphous hydrocarbon matrix, the metal carbide crystals having a size of less than about 10 nm and comprising less than 50% of the coating; the coating having a thickness which will enable the bearing to operate for a predetermined period of time after an oil-out condition starts; wherein the coating has a thickness (d) which satisfies the following equation:

$$d = \frac{K'Pv}{n}(t - t_0)$$

where d=coating thickness

P is the ratio of force applied to the rollers/contact area;

v is the sliding velocity n=the number of roller elements;

$(t-t_0)$=the desired operating time after oil-out condition starts; and

K' is the Archard constant;

and wherein the ratio d/K' is greater than $10^{11}$ Pa-m.

16. The roller bearing assembly of claim 15 wherein the wear byproduct of the coating is graphite.

17. The roller bearing assembly of claim 15 wherein the metal carbide is a tungsten carbide.

* * * * *